United States Patent [19]

Azegami

[11] 3,784,919

[45] Jan. 8, 1974

[54] DRIFT-COMPENSATED ANALOG HOLD CIRCUIT

[75] Inventor: Tadashi Azegami, Tokyo, Japan

[73] Assignee: Fisher & Porter Company, Warminster, Pa.

[22] Filed: Aug. 14, 1972

[21] Appl. No.: 280,672

[30] Foreign Application Priority Data

Aug. 31, 1971 Japan ............................... 46/66328

[52] U.S. Cl. ................. 328/127, 235/183, 307/229, 307/235, 328/151

[51] Int. Cl. .......................... G06g 7/18, H03k 5/00

[58] Field of Search ........................... 307/229, 235; 328/127, 151; 330/9; 340/347 CC; 235/183

[56] References Cited

UNITED STATES PATENTS

| | | | |
|---|---|---|---|
| 3,070,786 | 12/1962 | MacIntyre | 340/347 CC |
| 3,200,338 | 8/1965 | Ellis | 330/9 X |
| 3,421,093 | 1/1969 | Hinrichs et al. | 340/347 CC |
| 3,541,320 | 11/1970 | Beall | 328/151 |
| 3,593,164 | 7/1971 | Newbold | 328/127 |
| 3,633,004 | 1/1972 | James et al. | 328/151 |
| 3,667,055 | 5/1972 | Uchida | 330/9 |

*Primary Examiner*—Stanley D. Miller, Jr.
*Attorney*—Michael Ebert

[57] ABSTRACT

A drift-compensated analog hold circuit in which the output of the analog hold circuit is converted into a pulse train signal which is compared with reference clock pulses to detect the amount of drift in terms of a time-based signal. An analog drive circuit responsive to this time-based signal supplies a drift compensation signal to the analog hold circuit.

1 Claim, 5 Drawing Figures

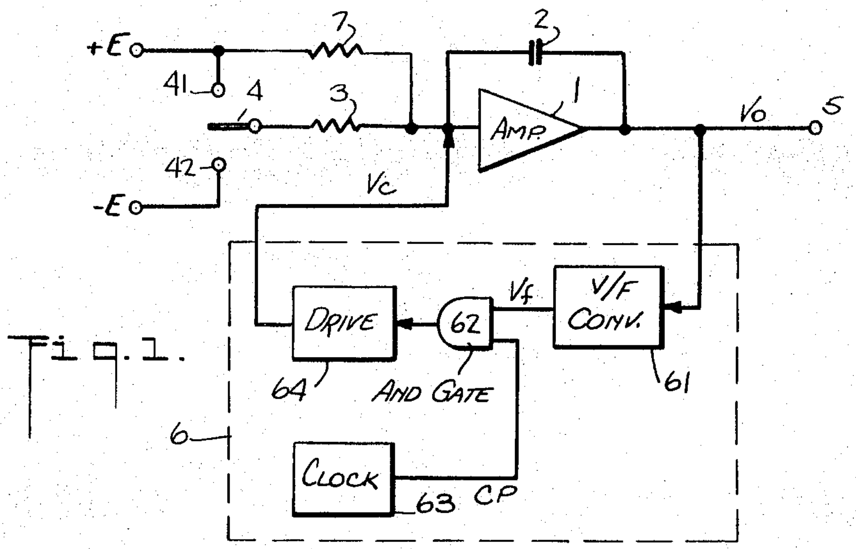
FIG. 1
FIG. 2A
FIG. 2B
FIG. 2C
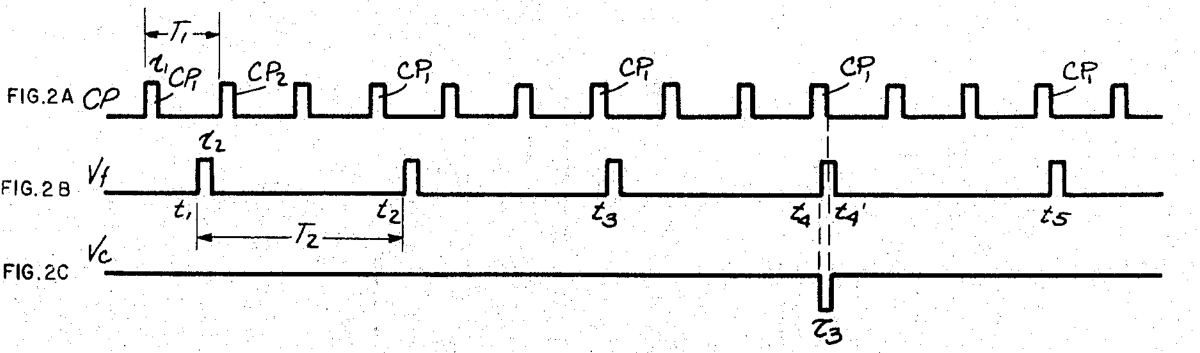
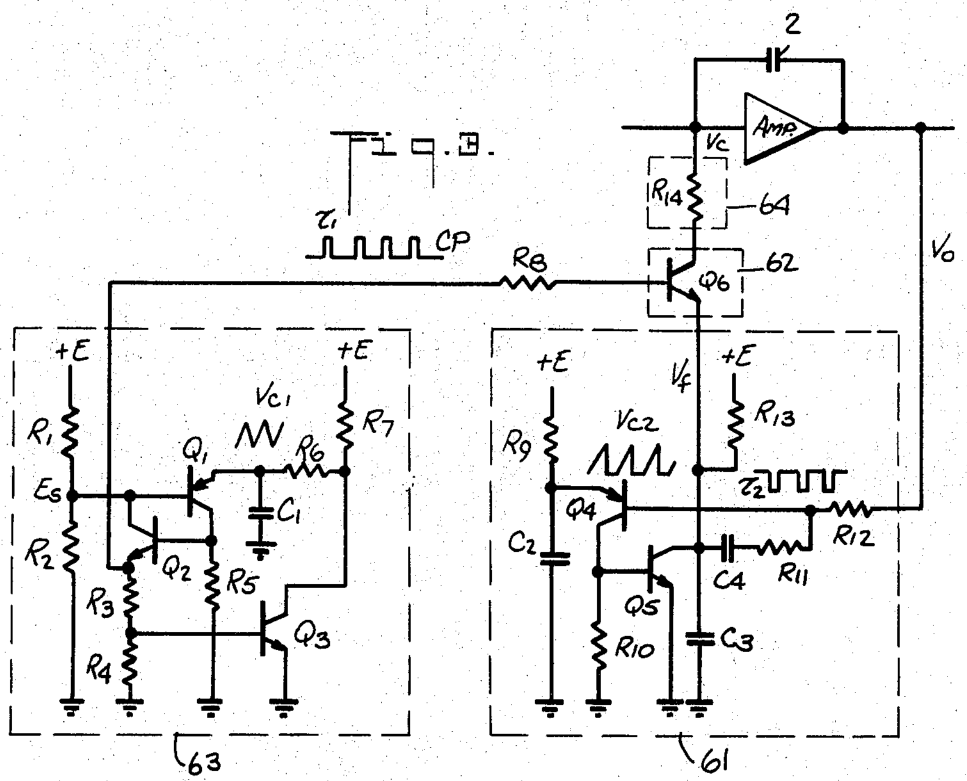
FIG. 3

DRIFT-COMPENSATED ANALOG HOLD CIRCUIT

BACKGROUND OF INVENTION

This invention relates to an electronic circuit adapted to compensate for the drift of an analog integral hold circuit.

In process control technology, it was heretofore customary to use a mechanical memory device, such as a potentiometer, to deliver a control signal to a valve in order to hold its position. However, such a mechanical device has tendency to wear. Furthermore, it requires an expensive servomechanism to track an external signal. To overcome these shortcomings, an electronic analog hold circuit also has been used for the same purpose. In this instance, an amplifier with an integrating capacitor functions electronically to drive the valve. With a circuit of this type, tracking of the external signal is much less expensive than servo mechanism.

However, this new method has given rise to another problem, namely drift of the output. The charge stored in the capacitor will decay through the leakage resistance of the capacitor and the finite impedance of the amplifier, thereby changing the output with respect to time. Even when combining a high quality plastic film capacitor and a high impedance amplifier having input bias current of less than several pA, being careful to maintain insulation resistance of the printed circuit board etc., it still has been difficult to reduce the output drift rate $\Delta Eo/Eo$ to below 1 percent/ 100 hr. This situation is particularly aggravated under environmental conditions of high temperature and high humidity.

SUMMARY OF INVENTION

The main object of this invention is to realize a drift-free analog hold circuit by adding a simple, drift compensation circuit to an ordinary analog hold circuit.

Briefly stated, a drift-free analog hold circuit in accordance with the invention is realized by:

a. Means which converts the output voltage of the analog hold circuit into a pulse train signal.

b. Means which compares the pulse train signal with a reference clock pulse. This means is provided to detect the amount of drift as a time-based signal.

c. Means feeding a compensation signal to the analog hold circuit upon receiving the time-based drift signal.

OUTLINE OF DRAWING

Figure 5:
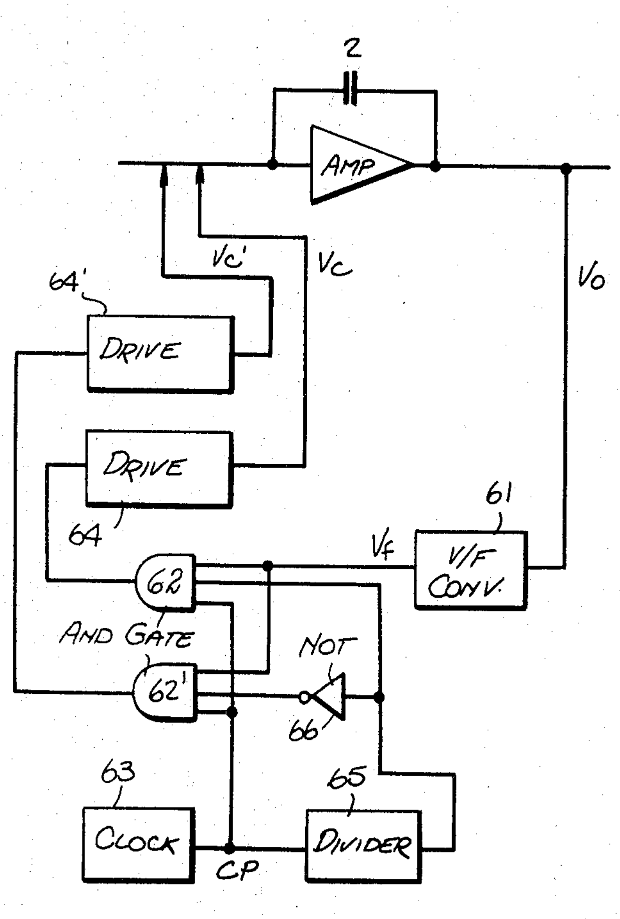

For a better understanding of the invention as well as other objects and features thereof, reference is made to the following description to be read in conjunction with the accompanying drawing wherein:

FIG. 1 shows the basic block diagram of a system related according to the invention;

FIGS. 2(A), 2(B), and 2(C) graphically illustrate the operating principles underlying the invention;

FIG. 3 is the schematic circuit diagram shown in FIG. 1;

FIGS. 4(A) to 4(H) illustrate V/F characteristics of the converter;

FIG. 5 shows a modified system in accordance with invention.

In the figures, the following identifying symbols are employed:

1 and 2: Analog hold circuit
Vo: Output of analog hold circuit
6: Drift compensation circuit comprising:
61: Voltage-to-frequency converter
Vf: Pulse train signal
62: And-gate
63: Clock pulse generator
CP: Clock pulse
64: Analog drive circuit

DESCRIPTION OF INVENTION

In FIG. 1, numeral 1 is an operational amplifier and numeral 2 is an integrating capacitor and these together constitute an integral hold circuit. The input to the operational amplifier is connected to a positive voltage source +E or negative voltage source −E through a resistor 3 and a switch 4 so that the hold circuit produces the output Vo. Depending upon the switch position, the output voltage of the analog hold circuit is such that:

1. The output voltage decreases when the switch 4 is switched over to +E contact 41.
2. The output voltage increases when the switch 4 is switched over to −E contact 42.
3. The output voltage is in holding state when the switch 4 is in neutral position.

The operation principle is described below. In general, drift of an analog hold circuit is in random fashion, but it is possible to maintain drift within one direction under the operating conditions. In FIG. 1, a resistor 7 is intentionally placed between +E and the input to amplifier 1 to maintain drift in the negative direction.

Figure 4A:
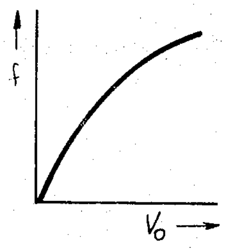
Figure 4B:
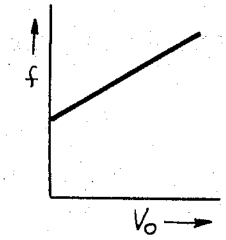
Figure 4C:
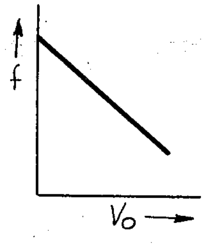
Figure 4D:
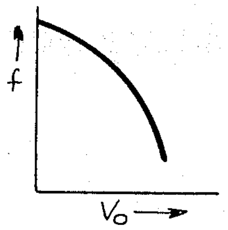
Figure 4E:
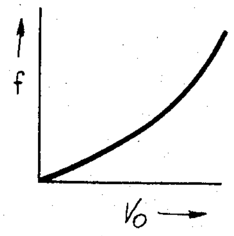
Figure 4F:
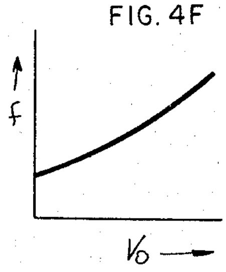
Figure 4G:
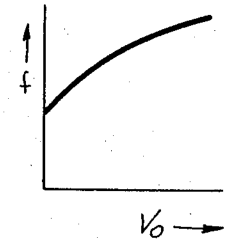
Figure 4H:
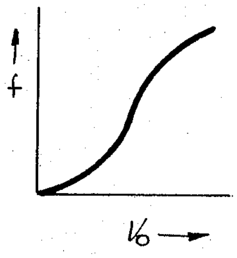

Let's suppose that the switch 4 is in its neutral position and the output pulse of the V/F converter lies between clock pulses at a certain time $t1$, as shown in FIG. 2. Also assume that the voltage-to-frequency converter 61 is designed to provide a predetermined relationship between the output Vo of the analog hold circuit and the output frequency $f$ of the V/F converter as shown in FIG. 4(C) or (D).

The output voltage Vo of the analog hold circuit decays gradually due to drift, and then the output frequency of the V/F converter increases. But the And-gate 62 does not yet operate. The greater the drift, the more the output frequency of the V/F converter increases, until coincidence between a clock pulse 63 and the output Vf of converter 61 takes place as shown in FIG. 2. The And-gate generates a pulse which is fed into the analog drive circuit 64. And the analog drive circuit 64 then produces an output VC to compensate the analog hold circuit in the positive direction during the time $\tau3$ so as to correct for drift.

As shown in FIG. 2, the clock pulse has a fixed width $\tau1$ and a constant period T1, and the pulse train signal Vf has a fixed width $\tau2$ and a variable period T2 which is uniquely determined by the output voltage of the analog hold circuit.

The width and period of the clock pulse and the pulse train signal are chosen for the system to effect a correct compensating operation as follows:

1. To adjust the correction signal Vc so that the range of variable period T2 lies within the period T1 of the clock pulse.
2. To trim the resistor 7 so that the range of variable period T2 lies within the period T1 of the clock pulse.

If these two conditions are satisfied, the output of the analog hold circuit is kept within a specified limit.

The voltage-frequency converter 61 may have any of the transfer characteristics shown in FIG. 4(A) to (H).

But it is preferable to use a V/F converter which has the curve of either FIG. 4 (B), (C), (D), (F) or (G).

In FIG. 3, a practical example of a compensation circuit is shown. The voltage-to-frequency converter consists of two transistors Q4 and Q5. The converter converts the output voltage of the analog hold circuit to a pulse train signal Vf having a frequency $f$, where $f$ is functionally related to the output voltage Vo of the analog hold circuit in the manner shown in FIG. 4(D). The voltage Vc2 which is produced by the R9—C2 series circuit and the voltage +E is applied to the emitter of the transistor Q4 where it is compared with the output voltage Vo of the analog hold circuit voltage Vo applied to the base of the transistor Q4 through a resistor R12. When voltage Vc2 is greater than voltage Vo, the transistor Q4 conducts. The collector current of the transistor Q4 flows into the base of the transistor Q5. This renders transistor Q5 conductive. The collector of the transistor Q5 is raised to the level of the +E voltage through resistor R13 and it also is connected to the base of the transistor Q4 through resistor R11 and capacitor C4. The capacitor C4 is charged to (+E−Vo) volts in its initial state when Q4 and Q5 are in a cut-off state. When both transistors start conducting, the base potential of the Q4 is further lowered by the effect on capacitor charge of the C4. That is, the positive feedback effect occurs, then the stored charge in capacitor C2 is rapidly discharged through the transistors Q4 and Q5. At the same time the stored charge in capacitor C4 is discharged through resistor R11 and the transistor Q4 and then the base potential of the transistor Q4 goes down to ground level, thereby making the transistor Q4 move into a cut-off state. As a result of the positive feedback effect, the transistors Q4 and Q5 return to the cut-off state again. The waveform of Vc2 is a saw-tooth with its frequency in inverse proportion to the amplitude of Vo. And the output of the transistor Q5, that is the output of the converter, is a pulse train signal having a width $\tau 2$, an amplitude equal to +E and a frequency in inverse proportion to the amplitude of Vo. The width $\tau 2$ is determined by capacitor C4, resistor R11 and the charged voltage (+E−Vo), and it is varied by the output voltage Vo of the analog hold circuit. But in practice this is negligible. The capacitor C3 provides means to eliminate noise.

Clock pulse generator 63 yields a clock pulse CP with a constant width $\tau 1$ and a fixed period T1. The clock pulse generator consists of three transistors Q1, Q2 and Q3. The value Vc1 is a voltage across a capacitor C1 which is charged through the resistors R6 and R7 and is applied to the emitter of the transistor Q1. Voltage Es which is determined by the resistors R1 and R2 and a supply voltage +E is applied to the base of the transistor Q1. When value Vc1 exceeds Es, the transistor Q1 conducts, and the collector current flows into the resistor R5 and the base of the transistor Q2. The collector of transistor Q1 is connected to its base and the emitter of transistor Q2 is connected to ground through the resistors R3 and R4. The voltage across the resistor R4 is applied to the base of the transistor Q3. The collector of transistor Q3 is connected to the junction of the resistor R6 and R7. Transistor Q3 provides means to prevent charging into capacitor C1.

At the initial state, the charge of the capacitor C1 is zero and the transistors Q1, Q2 and Q3 are in their cut-off state. As time goes on, value, Vc1 increases, then the transistor Q1 starts conducting and it is followed by the conduction of transistor Q2. The positive feedback effect makes transistors Q1 and Q2 conduct rapidly. Then transistor Q3 conducts. At this moment, the junction of the resistor R6 and R7 is pulled down to ground level by transistor Q3. This arrests charging of capacitor C1. The stored charge of capacitor C1 is discharged through transistors Q1, Q2 and resistor R6. But in this case, since the values of resistors R3, R4, R5 and R6 are so chosen that $$R5 >> R6 > (R3 + R4) ,$$

the time constant of this discharge is determined by capacitor C1 and resistors (R3 + R4).

When capacitor C1 discharged to zero, transistors Q1 and Q2 are rapidly forced into the cut-off state by the positive feedback effect.

The generator repeats this process and gives a pulse of a constant width $\tau 1$ and a fixed period T1.

As shown in FIG. 3, an And-gate 62 consists of a transistor Q6. The clock pulse is fed into the base of the transistor Q6 and the pulse train signal Vf is applied to the emitter of the transistor Q6. The output of the And-gate is connected to the input of the analog hold circuit through resistor R14 which is an analog drive circuit. When coincidence occurs between the clock pulse and the pulse train signal, transistor Q6 conducts, then Vc which has a width $\tau 3$ as shown in FIG. 2(C), is applied to the analog hold circuit to compensate for drift.

In the example described above, drift is held to one direction by the resistor 7 (in FIG. 1). The arrangement illustrated in FIG. 5 shows a compensation scheme which can compensate bidirectional drift. An And-gate 62′, an analog drive circuit 64′, a one-half divider 65 and a Not circuit 66 are added to the figures shown in FIG. 1. In this scheme the correction for upward drift is done by the circuits comprising 62 and 64 and the correction for downward drift is done by the circuits comprising 62′, 66 and 64′, these corrections can be made on a time-sharing basis.

The direction of drift is, however, more simply controlled by a resistor as shown in FIG. 1. Therefore the scheme shown in FIG. 1 is rather more practical than that in FIG. 5. I claim:

1. A drift-compensated analog hold circuit comprising:

a. an analog hold circuit composed of an amplifier and an integrating capacitor, b. a converter circuit connected to the output of the analog hold circuit to convert the output of said analog hold circuit to a pulse train signal having a frequency which has a predetermined functional relationship to the output voltage of said analog hold circuit, c. a clock pulse generator yielding a clock pulse signal having a definite frequency, d. an And-gate having one input coupled to said converter circuit for receiving said pulse signal and having another input connected to said generator for receiving said clock pulse signal, said And-gate yielding an output signal when said two signals overlap, and e. an analog drive circuit connected between the output of said And-gate and the input of said amplifier for delivering a compensation signal to the input of said amplifier when the output signal of said And-gate is fed thereto.

* * * * *